United States Patent

[11] 3,584,287

| [72] | Inventor | Michel L. Binoche<br>Paris, France |
|---|---|---|
| [21] | Appl. No. | 862,867 |
| [22] | Filed | Oct. 1, 1969 |
| [45] | Patented | June 8, 1971 |
| [73] | Assignee | S.K.V. Seciete Anonyme<br>Stains, France |
| [32] | Priority | Oct. 2, 1968 |
| [33] | | France |
| [31] | | 168,437 |

[54] HIGH-VOLTAGE DIRECT-CURRENT GENERATOR
8 Claims, 10 Drawing Figs.

[52] U.S. Cl. ................................. 321/15, 317/234
[51] Int. Cl. ................................. H02m 7/00
[50] Field of Search ................. 317/234/4.1, 11; 321/15

[56] References Cited
UNITED STATES PATENTS

| 3,048,766 | 8/1962 | Panzer | 321/15 |
| 3,320,513 | 5/1967 | Cleland | 321/15 |
| 3,418,555 | 12/1968 | Jockel | 321/15 |
| 3,428,807 | 2/1969 | Jones et al. | 321/15 |

*Primary Examiner*—William M. Shoop, Jr.
*Attorney*—Amster and Rothstein

ABSTRACT: This high-voltage direct-current generator supplied with alternating current utilizes a so-called "Villard's chain" i.e. a voltage-adding and current-rectifying chain of capacitors and diodes.

The capacitor plates are disposed in two parallel spaced rows and the capacitor plates of any pair of successive adjacent capacitors in each line of capacitors are closely adjacent, the diodes being housed in the gap left between the two rows of capacitor plates, the diode and capacitor assembly being embedded in a mass of dielectric material in order to constitute a compact, three-terminal block.

Thus, a high-power generator can be constructed will very reduced overall dimensions and weight.

PATENTED JUN 8 1971 3,584,287
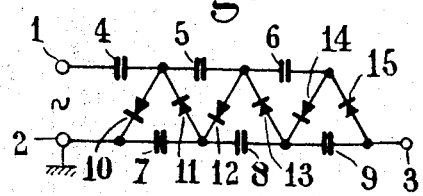
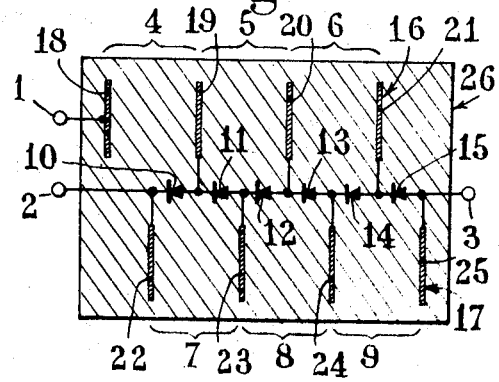
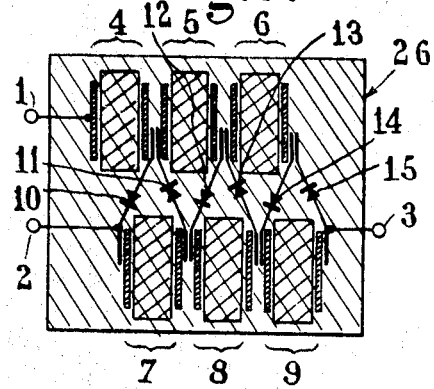
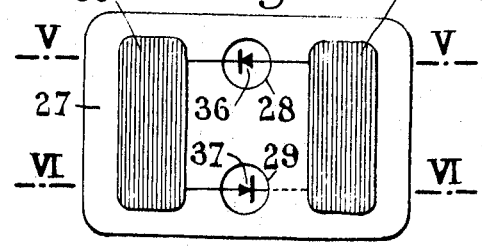
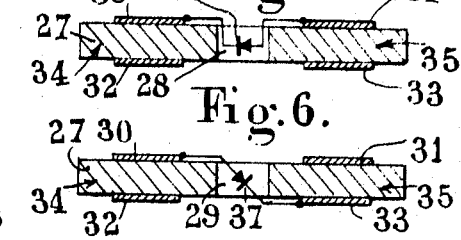
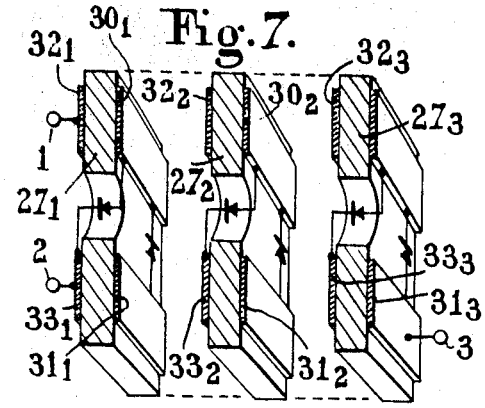
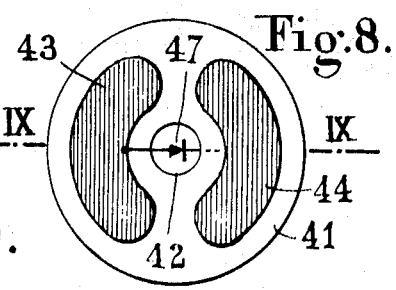
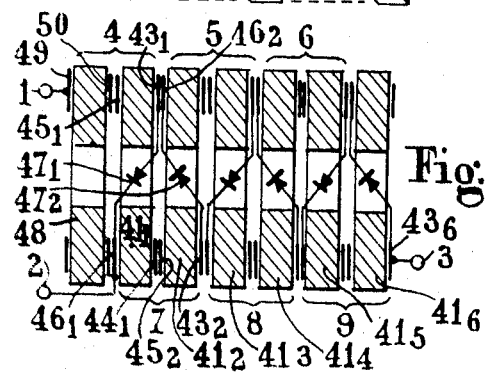
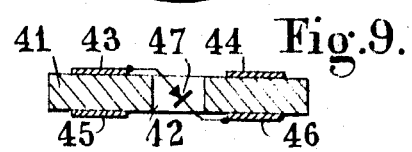
INVENTOR:
MICHEL L. BINOCHE
BY
Amster & Rothstein
ATTORNEYS

HIGH-VOLTAGE DIRECT-CURRENT GENERATOR

BACKGROUND OF THE INVENTION

The present invention relates to improvements in or relating to high-voltage direct-current generators supplied with alternating current and utilizing a so-called "Villard's chain" or "cascade adding chain" wherein the voltages are added and the current is rectified.

The Villard adding chain comprises a series of capacitors and diodes so arranged that the capacitors can be charged in parallel by the source of alternating current and discharged in series. These adding chains are obtained in general by assembling conventional components (capacitors and diodes).

SUMMARY OF THE INVENTION

It is the essential object of the present invention to miniaturize adding chains of this type by utilizing components specially designed for this purpose.

To this end the high-voltage DC generator according to this invention, which is fed with alternating current and utilizes a voltage-adding and rectifying chain called "Villard's chain," this chain comprising two lines of series-connected capacitors having their junction points interconnected by diodes also connected in series between two high-voltage output terminals, is characterized in that the capacitor plates are disposed in two parallel spaced rows, the plates of two adjacent capacitors in each line of capacitors being disposed in close proximity of each other, that the diodes are housed in the space available between the two rows of capacitor plates, and that the capacitor and diode assembly is embedded in a mass of dielectric material in order to constitute a compact three-terminal block.

Each line of capacitors may advantageously consist of a single, multistage capacitor of which at least one of the endmost plates is connected to an input and/or output terminal, the intermediate plates thereof being connected to the junction points of said series-connected diodes.

Each line of capacitors may also consists of stacked elementary capacitors with a diode-connecting conductor clamped between the two adjacent plates of a pair of adjacent capacitors.

In the adding chain according to this invention all the component elements are insulated as a whole, not separately. Not only the reduced overall dimensions and weight of the assembly afford an easier implementation of the chain, but furthermore the concentration of the component elements and the reduction in the number of connections therebetween facilitate the operation of this assembly under a relatively high AC frequency. This specific feature leads to a complementary reduction in the overall dimensions of the assembly since lower-capacity capacitors may be used for a given power output.

The reduction in the capacity not only of these capacitors but also of the complete adding chain is attended by a substantial increment in the safety characteristic of the assembly, in case of fortuitous contact or ground arcing. This safety characteristic is particularly advantageous when the generator according to this invention is utilized for energizing electrostatic paint guns.

According to a modified form of embodiment of this invention, the adding chain comprises stacked elements each consisting of a dielectric plate carrying the metal plates of capacitors and at least one diode connected across the two capacitor plates.

This specific form of embodiment of the invention permits a further reduction in the dimensions of the adding chain and makes it possible to constitute this chain from an assembly of simple elements comprising each two capacitors and at least one diode.

BRIEF DESCRIPTION OF THE DRAWINGS

Various forms of embodiment of the present invention will now be described by way of example with reference to the attached drawing, in which:

FIG. 1 is a wiring diagram of voltage adding chain of the so-called Villard type;

FIG. 2 is a sectional view showing a practical form of embodiment of an adding chain;

FIG. 3 is a sectional view showing a modified form of embodiment of the adding chain;

FIG. 4 is a plan view from above showing a component constituting a double stage in a modified form of embodiment of the adding chain;

FIG. 5 is a section taken along the line V–V of FIG. 4;

FIG. 6 is a section taken along the line VI–VI of FIG. 4;

FIG. 7 is a perspective exploded view showing a three-stage adding chain obtained by stacking three elementary components of the type illustrated in FIGS. 4, 5 and 6;

FIG. 8 is a plan view from above showing a modified form of embodiment of a component constituting a double half stage in the adding chain;

FIG. 9 is a section taken along the line IX–IX of FIG. 8; and

FIG. 10 is a sectional view showing a three-stage adding chain consisting of stacked components of the type illustrated in FIGS. 8 and 9.

DESCRIPTION OF THE PREFERRED EMBODIMENT

The voltage-adding and rectifying chain, also referred to as a "Villard's chain," comprises as shown in FIG. 1 a series of capacitors and diodes so arranged that the capacitors can be charged in parallel from a source of alternating current and discharged in series.

More particularly, the chain comprises two input terminals 1 and 2 connected to an AC source. The generally grounded terminal 2 also constitutes an output terminal in conjunction with another output terminal 3, the high-voltage DC being produced across the terminals 2 and 3.

In the illustrative form of embodiment of which the wiring diagram is shown in FIG. 1 the adding chain comprises two parallel lines each comprising three series-connected capacitors, i.e. capacitors 4, 5 and 6 on the one hand, connected across terminals 1 and 3, and capacitors 7, 8 and 9, on the other hand, connected across terminals 2 and 3.

Besides each junction point between two adjacent capacitors of a same line of capacitors is connected via a pair of diodes to two other junction points between successive capacitors of the other line, respectively or alternatively to one of the terminals 2 or 3 at the ends of the chain. Thus, as shown in FIG. 1, the adding chain comprises on the other hand six diodes 10, 11, 12, 13, 14 and 15 connected with alternate polarities between the various junction points of the capacitors, these diodes being connected in series with each other across the terminals 3 and 2.

Assuming V to be the peak-to-peak value of the alternating voltage fed across terminals 1 and 2, and $2n$ to be the number of capacitors and diodes in the adding chain ($n=3$ in the example illustrated in the drawing), a direct voltage having a value $n.V$ will be available across terminals 2 and 3. In the case of the diagram illustrated in FIG. 1, terminal 3 will be the negative terminal.

Now reference will be made to FIG. 2 to describe a first form of embodiment of a compact adding chain according to this invention, this chain being of the three-stage type according to the diagram of FIG. 1.

In the specific form of embodiment shown in FIG. 2 the elementary capacitors 4, 5 and 6, on the one hand, and 7, 8 and 9 on the other hand are grouped into two multistage capacitors 16 and 17. Capacitor 16 comprises four parallel plates 18, 19, 20 and 21 separated by a suitable dielectric material to constitute together the three series-connected capacitors 4, 5 and 6. Similarly, the other capacitor 17 comprises four parallel plates 22, 23, 24 and 25 separated by a suitable dielectric material and constitute the three series-connected capacitors 7, 8 and 9. Besides, the six diodes 10 to 15 are connected in series across these capacitors 16 and 17. The endmost plates 18, 22 and 25 are connected to terminals 1, 2 and 3, respectively, and the other plates 19, 23, 20, 24 and 21 are connected to the junction points provided between the diodes 10 and 11, 11 and 12, 12 and 13, 13 and 14, 14 and 15, respectively.

This assembly is subsequently embedded in a block 26 of suitable dielectric material which may be the same as that employed for capacitors 16 and 17.

According to a modified form of embodiment each multistage capacitor 16 and 17 may be replaced by a stacking consisting of three single-stage capacitors as illustrated in FIG. 3. The conductors connecting the various diodes 10 to 15 to the plates of these single-stage capacitors are clamped between the adjacent plates of two successive capacitors of each line of capacitors. In this case too, the diodes 10—15 are disposed between the lines of capacitors 4—6 on the one hand and 7—9 on the other hand, and the assembly is embedded in a suitable dielectric material 26.

The two forms of embodiment illustrated in FIGS. 2 and 3 are advantageous in that the adding chain consists of a compact unit in which all the component elements are isolated as a whole but not separately.

Now reference will be made to FIGS. 4 to 7 to describe another form of embodiment of the invention. In this case the adding chain consists of a stacking of identical elementary component elements one of which is shown in FIGS. 4, 5 and 6. Each component elements comprises a dielectric support plate 27 of square or other configuration, through which a pair of holes 28 and 29 are formed. On each face of this plate 27 there are deposited by a suitable metallization process two capacitor plates having, say, a rectangular shape. Thus, the support plate 27 carries on its upper face a pair of capacitor plates 30 and 31, and on its lower face another pair of parallel capacitor plates 32 and 33 registering with the upper capacitor plates 30 and 31 respectively. The pair of capacitor plates 30, 32 constitutes in conjunction with the portion of dielectric layer disposed therebetween a first capacitor 34 and similarly the other pair of capacitor plates 31, 33 constitutes another capacitor 35. In the hole 28 of plate 27 a diode 36 is located; the diode 36 is connected across the upper capacitor plates 30 and 31. Similarly, in the other hole 29 of plate 27 another diode 37 connected across the upper capacitor plate 30 and the lower capacitor plate 33 is received. Both diodes 36 and 37 are connected with opposite polarities with respect to the capacitor plate 30 to which both are connected.

The support plate 27 carrying the pair of capacitors 34, 35 and the pair of diodes 36, 37 constitutes a double stage of an adding chain. Under these conditions it is only necessary to stack $n$ support plates 27 of this type to constitute an adding chain comprising $n$ double stages. FIG. 7 illustrates diagrammatically a stacking comprising three support plates $27_1$, $27_2$ and $27_3$ constituting a three-stage adding chain. The capacitor plates $32_1$ and $33_1$ of the first plate $27_1$ are connected to terminals 1 and 2, respectively. The capacitor plates $30_1$ and $31_1$ of the first support plate $27_1$ contact the corresponding capacitor plates $32_2$ and $33_2$ of the second plate $27_2$; the capacitor plates $30_2$ and $31_2$ of support plate $27_2$ contact the capacitor plates $32_3$ and $33_3$ of support plate $27_3$. Finally, capacitor plate $31_3$ is connected to the output terminal 3.

Now reference will be made to FIGS. 8 to 10 showing another form of embodiment of the invention. In this form of embodiment, the $n$-stage adding chain consists of stacked components one of which is illustrated in FIGS. 8 and 9.

Each elementary component of the adding chain illustrated in these figures comprises a dielectric support plate 41 of circular configuration as shown, although any other suitable shape may be adopted therefore, this support plate having a central through hole 42 and being provided on each main face, for example by metallization, two kidney-shaped or otherwise shaped capacitor plates (FIG. 8). In FIG. 9 it will be seen that the support plate 41 carries on its upper face two capacitor plates 43 and 44 and on its lower face another pair of capacitor plates 45 and 46 registering with the upper capacitor plates 43 and 44 respectively. Besides, a diode 47 is housed in the central hole 42 and connected to the upper plate 43 and lower plate 46, as shown.

As illustrated in FIG. 10, the three-stage adding chain according to this invention consists of a stacking comprising six elementary components $41_1$, $41_2$...$41_6$ of the type illustrated in FIGS. 8 and 9, and an end component 48 without any diode. The six dielectric plates $41_1$, $41_2$...$41_6$ are assembled coaxially but shifted alternately by 180° about their common axis. Considering a pair of adjacent support plates of this stacking, for instance support plates $41_1$ and $41_2$, it will be seen that the capacitor plate $43_1$ of support $41_1$ contacts the capacitor plate $46_2$ of support plate $41_2$ and that capacitor plate $44_1$ contacts the registering capacitor plate $45_2$ since the adjacent support plates $41_1$ and $41_2$ are shifted by 180° in relation to each other. The two capacitor plates $44_1$ and $45_2$ are not connected to the electric circuit and therefore constitute an intermediate capacitor plate for capacitor 7 comprising the capacitor plates $46_1$ and $43_2$ connected via diodes $47_1$ and $47_2$ respectively to the capacitor plates $43_1$ and $46_2$ in mutual contact. In FIG. 10 the other capacitors 5, 6, 8 and 9 of the adding chain are constructed and assembled in the same fashion.

The first plate 48 does not comprise any diode and its capacitor plate 49 constituting with the capacitor plate $43_1$ of support plate $47_1$ the first capacitor 4 is connected to the capacitor plate $46_1$ of support/plate $47_1$, the output terminal 3 being connected to capacitor plate $43_6$ of the last support plate $47_6$.

However, the endmost component element 48 can be dispensed with if the half capacitor consisting of capacitor plates $45_1$ and $43_1$ is capable of withstanding the full peak-to-peak voltage from the AC source. In this case, the terminal 1 can be connected directly to capacitor plate $45_1$. The first capacitor of the chain will thus have twice the capacity of the other chain capacitors.

From the foregoing it will be seen that each capacitor 4 to 9 operates as if it were built with a dielectric having twice the thickness of the support plate. Under these conditions it is clear that each partial or elementary capacitor consisting of two capacitor plates (for instance plates 44 and 46) registering with each other on each support plate 41 constitutes a half capacitor of the adding chain. Therefore, each elementary component constitutes a double half stage comprising one diode and two half capacitors.

In order to obtain a theoretical multiplying coefficient (without loss) having $n$-times the peak-to-peak feed voltage, the chain must comprise $2n$ one-diode support plates or, alternately, $n$ two-diode support plates similar to the one illustrated in FIGS. 4, 5 and 6.

The capacitors constituting this adding chain have a dielectric thickness equal to the thickness of the support plate in the case of two-diode plates. The one-diode plate thickness corresponds to half the thickness of the dielectric layer of a capacitor (disregarding the thickness of the capacitor plates proper and the gap left between two support plates in the case of one-diode support plates).

Of course, the shape of these support plates and the diode position may be altered to take due consideration of manufacturing and assembling conditions and requirements. More particularly, reference marks may be provided on the support plates for properly positioning these support plates in relation to each other.

In the example illustrated in FIG. 10, the various support plates are stacked upon one another with the capacitor plates contacting each other directly. If for preserving the insulation between the component elements of the device a gap is contemplated between these support plates a suitable electric junction must be provided between registering capacitor plates, but this requirement can be met without any difficulty.

The elementary components of the adding chains described hereinabove may be constructed by utilizing the most up-to-date integrated circuit techniques, by depositing the diode-forming junction on the dielectric of the capacitor proper.

Of course, the various forms of embodiment of the invention which have been described and illustrated hereinabove should not be construed as limiting the scope of the invention since many modifications and variations may be brought thereto without departing from the spirit of the invention as set forth in the appended claims.

What I claim is:

1. A high-voltage direct-current generator supplied with alternating current, which utilizes a voltage-adding and current-rectifying chain such as a "Villard's chain," which comprises a first input terminal, a second input earthed terminal, a third high voltage output terminal, a first line of series-connected capacitors connected between said first and third terminals, a second line of series-connected capacitors connected between said second and third terminals, and diodes connected in series across said second and third terminals, each diode interconnecting the junction points of the capacitors of said two lines of capacitors, wherein the plates of the two lines of series-connected capacitors are physically disposed in two parallel spaced rows, respectively, the capacitor plates to two successive capacitors in each line of capacitors being disposed in close proximity of each other, said diodes being housed in the gap left between said two rows of capacitor plates, the assembly of diodes and capacitors being embedded in a mass of dielectric material in order to constitute a compact three-terminal block.

2. A generator as set forth in claim 1, wherein each line of capacitors consists of a single, multistage capacitor of which at least one of the endmost capacitor plates is connected to an input and/or output terminal, the intermediate capacitor plates being connected to the junction points of said series-connected diodes.

3. A generator as set forth in claim 1, wherein each line of capacitors consists of a stacking of elementary capacitors, and comprising a diode connection conductor clamped between the two adjacent capacitor plates of two successive elementary capacitors.

4. A generator as set forth in claim 1, wherein said chain consists of stacked elements each comprising a dielectric support plate, metal capacitor plates carried by said dielectric support plate, and at least one diode connected between two capacitor plates.

5. A generator as set forth in claim 4, comprising first and second capacitor plates carried on one face of each dielectric support plate, and third and fourth capacitor plates carried on the opposite face of said support plate and parallel to, and registering with, said first and second capacitor plates, respectively, said support plate further comprising a first through hole formed in said support plate and a first diode received in said hole and interconnecting said first and fourth capacitor plates.

6. A generator as set forth in claim 5 comprising a second through hole formed in said support plate and a second diode received in said second hole and connected across said first and second capacitor plates.

7. A generator as set forth in claim 5, wherein said dielectric support plates carry each two diodes, the successive support plates being stacked to cause the third and fourth capacitor plates of a same support plate to be either in direct contact with, or electrically connected to said first and second capacitor plates of an adjacent support plate, respectively.

8. A generator as set forth in claim 5, wherein said support plates carry only one diode and are so stacked as to be alternately shifted by 180° about their common axis, whereby said first and second capacitor plates of a support plate be either in direct contact with, or electrically connected to, said fourth and third capacitor plates of an adjacent support plate, respectively.